Dec. 4, 1962 K. SCHAEFER 3,066,591
DIAPHRAGM CONTROL FOR PHOTOGRAPHIC APPARATUS
Filed Sept. 12, 1957 3 Sheets-Sheet 1

INVENTOR
KNUT SCHAEFER

BY Dicke and Gray

ATTORNEYS.

INVENTOR
KNUT SCHAEFER

BY Dicke and Craig
ATTORNEYS.

United States Patent Office 3,066,591
Patented Dec. 4, 1962

3,066,591
DIAPHRAGM CONTROL FOR PHOTOGRAPHIC
APPARATUS
Knut Schaefer, Gotthelfstrasse 65, Munich 27, Germany
Filed Sept. 12, 1957, Ser. No. 683,590
Claims priority, application Germany Sept. 13, 1956
16 Claims. (Cl. 95—64)

The present invention relates to a diaphragm control for photographic apparatus such as still and moving picture cameras.

Prior to this invention it was proposed that diaphragms for photographic apparatus which are controlled by an exposure meter and consist of two or three elements or blades which are movable within parallel planes relative to each other and each of which has a cutout, opening, or the like, and which are connected to each other by means of spring-loaded cords or the like, could thus be moved by means of an electric moving-coil instrument. However, in at least some instances the photoelectric current produced by an exposure meter is insufficient to produce the force necessary for turning the shaft of a moving-coil instrument.

In order to improve such diaphragm controls, it was also proposed to provide a relay within the circuit of the photoelectric cell, which relay controls an electric motor which is supplied with a battery current and adapted to adjust one or more diaphragms. However, the proper operation of such a diaphragm control requires an extremely sensitive relay.

It has also been proposed that diaphragms which consist of two elements which are movable within parallel planes relative to each other and each of which has a cutout, opening, or the like may thus be moved by means of a rocking lever or by pins which are slidably guided. If the size of the area of the light-passing aperture of the diaphragm is to be doubled or reduced to one-half, the element which indicates or controls the corresponding diaphragm stop must travel a different distance from one stop number to another. Although such diaphragms have the advantage over a simple aperture diaphragm that the diaphragm opening can be continuously adjusted, and over an iris diaphragm that they can be much more inexpensively manufactured, they do not provide that the element which indicates or controls the size of the aperture, for example, a diaphragm setting ring, must be moved a constant distance when the aperture size or the F number is to be changed by one stop, for example, from 2.8 to 4 or from 8 to 11, as the case is, for example, when the diaphragm control member cooperates with a scale with indications thereon about the possible light conditions which are adjustable relative to at least one other scale with indications about the illumination or brightness of the object.

It is further known that the blade elements of iris diaphragms may be controlled so that when the pointer indicating the diaphragm stop is adjusted between equidistant points in one direction or the other and from one of these points to the adjacent point, such adjustment will result in an increase of the area of the light-passing aperture to twice its previous size or to a decrease thereof to one-half of its previous size, respectively.

It is the principal object of the present invention to provide an improved, simple and inexpensive diaphragm control which achieves the advantages of the above-mentioned diaphragms.

Another object of the present invention is to provide a new diaphragm control which operates fully automatically.

The present invention relies upon a diaphragm design of the known type which consists of a pair of blade elements which are movable within parallel planes relative to each other and each of which has a cutout, opening, or the like. Similarly as in some of these prior designs, it is a further object of the present invention to attain an increase of the diaphragm aperture to twice its previous size or a decrease thereof to one-half its previous size when the diaphragm control member, for example, the diaphragm setting ring, is adjusted each time by an identical amount, for example, by the same angle or the same distance.

The features of the invention for attaining the last-mentioned object include the mounting of the diaphragm elements so as to be pivotable about a common axis or shaft connecting the same, and the provision of control surfaces, edges, or the like on these elements and further include a control member which is adapted to act upon these edges or surfaces and may be connected, for example, to a diaphragm setting ring, slide member, or the like on the camera so that a movement of this control member will be transmitted to both elements to adjust them relative to each other. A further feature is the provision of means for maintaining the control member in a positive connection with the control surfaces or edges. These last means may consist, for example, of resilient means, preferably springs, which act upon the blade elements to pull or press the same into a positive engagement with the control member, or of gear-shaped teeth on the blade elements which are in positive engagement with screw threads or the like on the control member. If the means for insuring a positive engagement between the blade elements and the control member are to be resilient, it is another feature of the invention to provide these means in the form of a single spring which acts upon both elements. For this purpose, each end of this spring is connected to a different element, while the central portion of the spring is placed around a fixed point, for example, a pin, roller, or the like.

Another preferred feature of the invention consists in the provision of at least two cutouts or openings in each blade element so that each cutout in one element cooperates with a corresponding cutout in the other element, and each pair of corresponding cutouts cooperates with a separate optical system. One of these optical systems may be that of a lens of a camera, while the other is preferably that of an electric exposure meter. In this case, the adjustments of the blade elements relative to each other varies the amount of light passing through the lens into the camera upon the film and simultaneously also the amount of light which passes to the photoelectric cell of the exposure meter.

The particular shape of the cutouts or openings in the blade elements according to the invention depends to some extent upon the particular position of the pivotal axis of the elements. If this axis is disposed near one end of the blade elements, both elements are preferably provided with at least one opening. For those cases, however, in which the blade elements are intended to form a scissorlike arrangement, the two adjustable diaphragm apertures are then formed by the angular portions of both blade elements at opposite sides of the pivot. In this case, the means for positively connecting the control member to these blade elements preferably consist of gear teeth on one end of the elements and a shaft which is provided with right-hand and left-hand screw or worm threads, one of which engages with the gear teeth of one blade element and the other with the gear teeth of the other element so that a rotary movement of the shaft in one or the other direction will enlarge or reduce both apertures.

For attaining an automatic diaphragm control, it is another feature of the present invention to provide the diaphragm adjusting means, for example, a moving coil instrument or an electric motor, within an electric circuit in which two sources of electric current produce two oppositely-directed currents, the voltage of one of which is variable and controlled by the photoelectric current of the exposure meter. The diaphragm adjusting means which may be controlled by electric currents may be disposed within a battery circuit which may be closed by a switch and which is connected to an amplifier for amplifying the current produced by the photoelectric cell of the exposure meter. If the diaphragm adjusting means consists of an electric motor, such motor may drive a shaft which is provided with right and left-hand threads or worms, and each diaphragm element may be provided with gear teeth which engage with one of these worms. Naturally, the present invention is not limited to such adjusting means but other means equivalent thereto may also be used.

Further objects, features, and advantages of the present invention will be apparent from the following detailed description thereof, particularly when read with reference to the accompanying diagrammatic drawings, in which—

FIG. 6 shows a front view of another modification of the diaphragm according to the invention which consists of two elements or blades which are pivotable relative to each other by a motor; while

Figure 1:
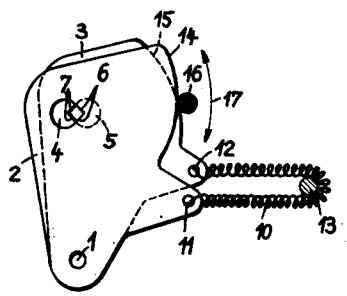
FIG. 1 shows a plan view of two diaphragm elements or blades according to the invention which are pivotable about a common axis and are provided with apertures, and are acted upon by a spring and adjustable by a control member.

Referring to the drawings, and first particularly to FIG. 1, the diaphragm according to the invention consists of two blade-shaped elements 2 and 3 which are pivotable about a common axis of a pin 1 and each of which has an opening or cutout 4 or 5, respectively. The edges 6 and 7 of the overlapping openings 4 and 5 extend symmetrically to the axis 8 of the lens 9 and define a symmetrical light-passing aperture regardless of the size of the light aperture to which the openings are adjusted. The two diaphragm elements 2 and 3 are acted upon by a spring 10, the two ends of which are connected to elements 2 and 3, for example, by being hooked into openings 11 and 12, while the central part of spring 10 is placed around a stationary pin, roller, or the like 13 which is mounted on the diaphragm housing. Elements 2 and 3 are provided with curved edges, surfaces, or the like 14 and 15, respectively, which may be termed control surfaces and are in engagement with a control means comprising a pin member 16 which may be connected, for example, to the diaphragm setting ring of the camera and which is adjustable in the direction shown by arrow 17. Edges 14 and 15 will be made of a shape depending upon whether the distances between the stop numbers which may be marked, for example, on the camera are even or uneven. In the embodiment illustrated in FIG. 1 it is assumed that any adjustment of control member 16 by a certain equal amount in one or the other direction results in a reduction to one-half or to an increase to twice the size of the aperture area formed between the edges 6 and 7 of openings 4 and 5.

Figure 2:
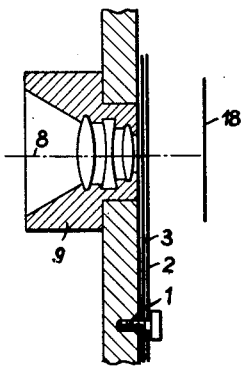
FIG. 2 shows a cross section through the lens of a camera and the wall of the camera housing supporting the lens, and the diaphragm elements as illustrated in FIG. 1.
Figure 3:
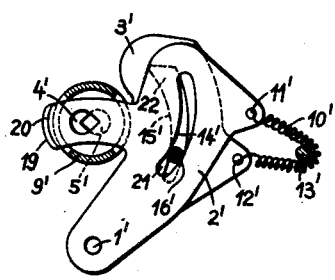
FIG. 3 shows a modification of the embodiment illustrated in FIG. 1.
Figure 4:
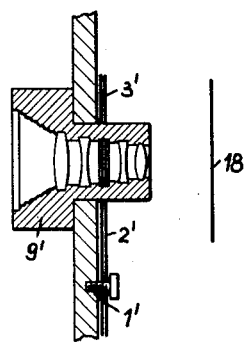
FIG. 4 shows a cross section similar to FIG. 2 but with the diaphragm elements according to FIG. 3 which are mounted within the lens between the lens elements.

As illustrated in FIG. 2, the two elements 2 and 3 may be disposed behind lens 9, that is, between the lens and the film 18 or, as illustrated in FIGS. 3 and 4, they may be provided with extensions 19 and 20 which extend between the elements of lens 9' and are provided therebetween with openings 4' and 5', respectively. In the latter case, diaphragm elements 2' and 3' are provided with curved slots 21 and 22, respectively, the edges 14' and 15' of which correspond to edges 14 and 15 of elements 2 and 3, respectively, as shown in FIG. 1. Elements 2' and 3' are also acted upon by a spring 10', the ends of which are hooked into openings 11' and 12', respectively, while its central portion is placed around a pin or the like 13'. Openings 4' and 5' correspond to openings 4 and 5, respectively, as shown in FIG. 1. If control member 16' is moved in the same manner as control member 16, elements 2' and 3' will be pivoted about a common axis 1' either under or against the action of spring 10'. For guiding control member 16 or 16', the front wall of the diaphragm housing is preferably provided with a guide slot, not shown.

If the diaphragms of two or more optical systems are to be controlled simultaneously, this may be done very simply by providing each of the two diaphragm elements with openings, cutouts, or the like in accordance with the prevailing number of the optical systems. If several openings are provided in each element, two corresponding openings of both elements may be designed to cooperate with an electric light meter in such a manner that an adjustment of these elements also results in a change in the amount of light entering into the light meter.

Figure 5:
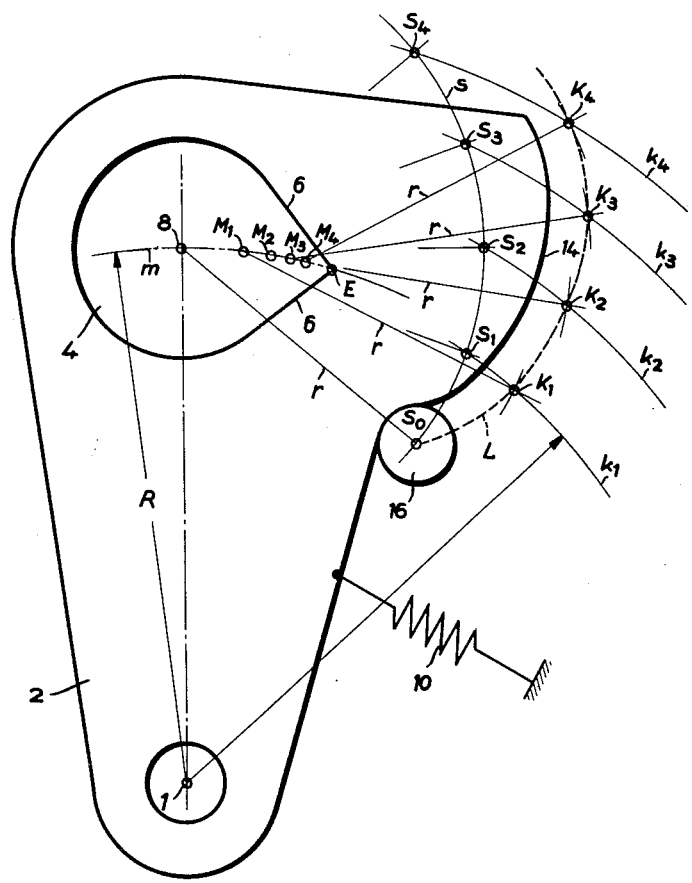
FIG. 5 shows a plan view of one of the two diaphragm elements with the various lines and points plotted thereon to illustrate the manner of designing the control edge of such element upon which the control member engages.

The manner of shaping the edges 14 and 15 of diaphragm elements 2 and 3 may best be described with reference to FIG. 5, although it only shows a view on an enlarged scale of element 2. The common axis of rotation of both diaphragm elements is indicated just as in FIGS. 1 to 4 by the numeral 1, the opening by 4, the optical axis by 8, the edges of opening 4 which limit the area of light admission by 6, the point of intersection of edges 6 by E, the edge which engages with control member 16 by 14, and the arc which intersects the optical axis 8 and the point of intersection E of edges 6 by the radius R.

If the control member 16 which adjusts the position of the diaphragm elements moves about the optical axis 8 of lens 9 along an arc $s$ concentric with the optical axis 8, as is the case if member 16 is rigidly connected to the diaphragm ring, the shape of edge 14 or of a corresponding surface on element 2 on which control member 16 engages during its pivotal movement may be very easily determined in the following manner:

The distance between the pivotal axis 1 of elements 2 and 3 and the optical axis 8 may be arbitrarily selected, that is, for example, corresponding to the radius R. The radius of the arc $s$ along which control member 16 for elements 2 and 3 is movable is likewise selected arbitrarily, and preferably so as to be smaller than the radius R. Each diaphragm element may, for example, be provided with an opening which essentially consists of a circular arc which extends concentrically to the optical axis 8 and which is enlarged by a cutout which is limited by two tangent lines to the circle which intersect at an angle of 90° and correspond to edges 6 and 7. The point of intersection of these tangents lies on an arc $m$, of radius R and concentric about axis 1, which intersects the optical axis 8 of the lens. The centroids $M_1$, $M_2$, $M_3$, $M_4$, etc. of the light passage areas corresponding to the different diaphragm apertures or stops are plotted on this arc $m$. The centroid of the light passage area of the fully opened diaphragm coincides with the optical axis 8. The centroid of the next-smaller diaphragm opening is indicated at $M_1$. Points $M_2$ to $M_4$ etc. correspond to the centroids of those light passage areas which correspond to the next-following diaphragm stops.

The size of the maximum opening to be provided in the two diaphragm elements will be fixed or determined by the maximum strength or speed of the lens which may be, for example, 1:2. The light passage area of the next diaphragm stop 2.8 will then be one-half of the area of the fully opened diaphragm. The same is true for the light passage areas of the following diaphragm stops 4, 5.6, 8, etc. In the presently assumed case, only the centroid of those light passage areas are indicated which correspond to the diaphragm stops 2 to 8. The position of the individual centroids depends upon the position of the two respective diaphragm elements and the respective opening to which the diaphragms have been adjusted.

If the points $S_0$, $S_1$, $S_2$, $S_3$, $S_4$, etc. are plotted on the arc $s$ at equal distances from each other, wherein each of these points S corresponds to a certain diaphragm stop, and if a circle with a radius $r$, which corresponds to the distance between the optical axis 8 and the axis of control member 16, is then drawn about each centroid $M_1$, $M_2$, $M_3$, $M_4$, etc., these circles will intersect at points $K_1$, $K_2$, $K_3$, $K_4$, etc. with other circles which have been drawn about the common pivotal axis 1 of the diaphragm elements and pass through the points $S_1$, $S_2$, $S_3$, $S_4$, etc. which were plotted on the arc $s$ along which the axis of control member 16 is movable. The line of connection between these points K determines the curvature of the dotted line L along which the axis of control member 16 is movable relative to diaphragm blade 2. The shape of edge 14 thus is determined as a line paralleling line L but informly spaced therefrom by a distance corresponding to the radius of the control member. These facts correspondingly apply to the shape of edge 15 of diaphragm blade 3. From the foregoing it will be obvious that to maintain symmetry of the edges 6 and 7 relative to the axis of the light aperture, the diaphragm elements 2 and 3 will be moved through the same angular displacement for each adjustment of aperture size. Also, it is apparent from FIGURE 5 that the angular displacement of the control member 16 about its pivotal axis coinciding with the axis 8 is substantially greater than the resulting pivotal movement of the diaphragm element about its pivot axis 1.

Figure 6:
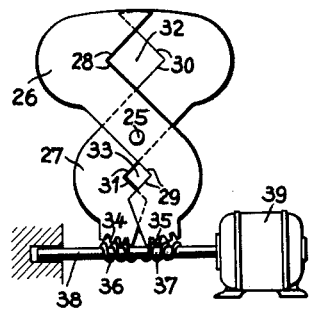
Figure 7:
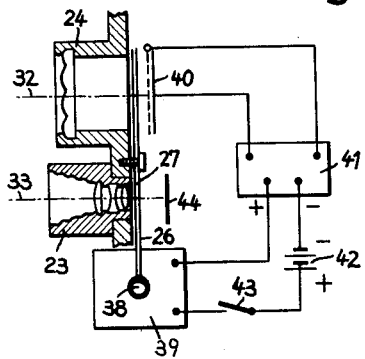
FIG. 7 shows a cross section through a lens, an exposure meter which cooperates with the lens, a diaphragm which cooperates with both optical systems, and the control means for adjusting the diaphragm.

In the embodiments of the invention as illustrated in FIGS. 6 and 7 it is likewise assumed that a camera only contains one lens 23 and one light meter 24 for cooperating with this lens. The two optical systems 23 and 24 cooperate with a diaphragm which consists of two blade-shaped elements 26 and 27 which are pivotable about a common axis at pin 25 relative to each other along parallel planes. Each element consists of a Z-shaped two-armed lever, each arm of which has a cutout, the respective cutouts being limited by the edges 28, 29, 30, and 31. Edges 28 and 30 and edges 29 and 31 extend symmetrically to the optical axis 32 of light meter 24 and to the optical axis 33 of lens 23, respectively. Two arms of elements 26 and 27 may, for example, be provided with gear teeth 34 and 35, respectively, which engage into worms 36 and 37, with right and left-hand threads, respectively, both of which are provided on a shaft 38 which may be rotated, for example, by an electric motor 39. As in the previous embodiment, the edges 28 and 30 and edges 29 and 31 retain their relative symmetrical positions with respect to the axes 32 and 33, respectively, and accordingly are shifted through the same angular displacement about the pivot at 25 in response to any rotation of the shaft 38, the latter having greater angular movement than the angular movement of either of the elements 26 and 27 during any aperture adjustment. The current supplied by the photoelectric cell 40 when acted upon by incident light is amplified by an amplifier 41 which preferably consists of transistors. This amplifier 41 is connected to a circuit which is supplied with current from a battery 42 and which aside from electric motor 39 also contains a switch 43.

If the diaphragm is in an open position which might result in a faulty exposure of the film 44, the following will occur: The current produced by the photoelectric cell 40 will be amplified by amplifier 41. If the output voltage of the amplifier is higher than the constant voltage of battery 42 and switch 43 is closed, the current flows in one certain direction. Motor 39 will then rotate in the direction to close the diaphragm blades 26 and 27 until, due to the reduced amount of light falling upon the light meter, the amplifier and battery voltages will become equal so that the current flowing within the battery circuit will drop to zero and motor 39 will stop. If the battery voltage is higher than the output voltage of the amplifier, the current will flow in the opposite direction, the motor will run in reverse and open the diaphragm until the voltage at the motor will again be zero. The incidence of light upon the photoelectric cell will therefore always be constant in accordance with the constant voltage of the battery.

Thus, as the photoelectric cell automatically has its diaphragm adjusted, the other diaphragm in front of the camera lens will likewise be adjusted to provide proper exposure of the film 44.

Naturally, this fully automatic selection may also be similarly applied to an apparatus which operates semi-automatically. In this case, the motor may be replaced by a setting ring, and the amplifier by a galvanometer, the pointer of which will be brought to coincidence with a mark which has been set in accordance with the film speed.

If the diaphragm control according to the invention is provided on a movie camera, battery 42 may be used as the source of current for the motor which effects the film transport. Switch 2 should then be in the form of a two-way switch to permit the use of either the battery circuit for operating the diaphragm or for operating the motor for the film transport.

If the voltage of battery 42 should drop when it is also used for driving the motor of the film transport, the film will move at a slightly lower speed. Since this would not change the position of the diaphragm, the film would be overexposed. In order to avoid this, it will merely be necessary to measure the exposure shortly before turning the two-way switch, that is, before making the next exposure so that, since the voltage of battery 42 will then be lower than the amplified output voltage of amplifier 41, the diaphragm will then be closed to a greater extent and the drop in the battery voltage will be automatically compensated.

In each of the illustrated embodiments of the invention, a single rotatable control member is provided with closely adjacent cam surfaces at one side of the common pivot point for the two diaphragm blade elements and engages the control surfaces of the latter at closely adjacent points. In fact, the points of engagement as seen in FIGURES 1 and 3 are substantially coincident. Also, it is to be noted that by movement in only one direction the cam surfaces of the control member cause the diaphragm blades to move in opposite directions about their common pivotal axis.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A diaphragm for photographic apparatus comprising a pair of blade elements, each of said elements having edges defining at least cutout at a point substantially corresponding to the cutout in the other element, said edges cooperating to define an adjustable light-passing aperture, each of said blade elements having an outer edge constituting a control surface, a pivot means connecting said elements to permit said elements to pivot within parallel planes relative to each other about a common axis equally spaced from said corresponding cutouts so that in one position of said elements, one element almost covers the corresponding cutout in the other element to form a small light-passing aperture, while in another position of said elements the edges of said corresponding cutouts in both elements together form a large light-passing aperture, control means comprising a member having an outer surface in position engagement with said control surfaces at closely adjacent points at one side of said common axis and movable relative to said elements to at least three predetermined equidistant positions to engage different parts of said control surfaces for adjusting said elements simultaneously in opposite directions about said common axis and relative to each other, said control means and said control surfaces being so constructed and arranged that, when said control means are moved between any adjacent two predetermined equidistant positions in one direction and from one of said positions to the adjacent position, the area of said aperture will be increased to twice its previous size, and when said control means are equally moved in the other direction from any one of said positions to the next adjacent position, said area will be reduced to one-half of its previous size.

2. A diaphragm for photographic apparatus comprising a pair of blade elements, each of said elements having edges defining at least one cutout at a point substantially corresponding to the cutout in the other element, said edges cooperating to define an adjustable light-passing aperture, each of said blade elements having an outer edge constituting a control surface, a pivot means connecting said elements to permit said elements to pivot within parallel planes relative to each other about a common axis equally spaced from said corresponding cutouts so that in one position of said elements, one element almost covers the cutout in the other element to form a small light-passing aperture, while in another position of said elements, the edges of said corresponding cutouts in both elements together form a large light-passing aperture, control means comprising a member having an outer surface engageable with and movable along said control surfaces and engaging the latter at closely adjacent points on one side of said common axis for adjusting said elements simultaneously in opposite directions about said common axis and relative to each other, resilient means acting upon said elements for maintaining said control surfaces in positive engagement with said control means, said control surfaces being shaped so that, when said control means are moved between predetermined points in one direction relative to said surfaces and from one of said points to the adjacent point, the area of said aperture will be increased to twice its previous size, and when said control means are equally moved in the other direction from said one point to a third predetermined point, said area will be reduced to one-half of its previous size.

3. A diaphragm as defined in claim 2, wherein said resilient means comprise a single spring having two ends, each connected to one of said blade elements, and a member mounted in a fixed position spaced from said elements, the central portion of said spring engaging around said member.

4. A diaphragm for photographic apparatus comprising a pair of blade elements, each of said elements having edges defining at least one cutout at a point substantially corresponding to the cutout in the other element, said edges cooperating to define an adjustable light-passing aperture and being symmetrically disposed on opposite sides of an axis of said aperture, and a control surface on each of said elements, a pivot means connecting said elements to permit said elements to pivot within parallel planes relative to each other about a common axis equally spaced from said corresponding cutouts so that in one position of said elements, one element almost covers the corresponding cutout in the other element to form a small light-passing aperture, while in another position of said elements the edges of said corresponding cutouts in both elements together form a large light-passing aperture, control means comprising a single member having an axis, camming surfaces on said single member, said camming surfaces comprising surfaces curved in directions around said last named axis, the centers of curvature of said curved surfaces lying on said last named axis, said control means being in positive engagement with said control surfaces and movable relative to said elements to successively engage different parts of said control surfaces for adjusting said elements relative to each other and simultaneously in opposite directions about said common axis to vary the size of said light-passing aperture, said member and said control surfaces being so constructed and arranged to provide substantially equal angular displacements of each element about said pivot axis in response to any movement of said single member.

5. A diaphragm as defined in claim 4, wherein each blade element has at least two cutouts, each cutout in one element being adapted to cooperate with a corresponding cutout in the other element to form at least two light-passing apertures, each of said apertures being adapted to cooperate with a separate optical system.

6. A diaphragm as defined in claim 5 in combination with a camera lens and an exposure meter having a photo-electric cell, wherein one of said apertures is disposed so as to lie within the optical axis of said lens, and the other aperture is disposed so as to lie within the optical axis of said exposure meter so that, when said blade elements are adjusted relative to each other by said control means, the amount of light passing through and beyond said lens and through one of said apertures and also the amount of light passing through the other aperture to said photoelectric cell will be changed simultaneously.

7. A combination as defined in claim 6, said control means further comprising an electric circuit, electric means within said circuit for automatically moving said single element for adjusting said blade elements relative to each other, two different sources of current for producing oppositely directed currents within said circuit, and means connected to said photo-electric cell and controlled by the electric current produced by said cell for controlling and varying the voltage of one of said currents.

8. A combination as defined in claim 7, wherein one of said two different sources of current comprises a battery, said means connected to said photo-electric cell comprising an amplifier, said battery and said photo-electric cell being included in said circuit, and an electric switch in said circuit for closing the same.

9. A combination as defined in claim 8 wherein said electric means for adjusting said blade elements relative to each other comprise an electric motor adapted to rotate in either direction.

10. A combination as defined in claim 8, wherein said electric means for adjusting said blade elements relative to each other comprise an electric motor adapted to rotate in either direction, each of said blade elements comprising a substantially Z-shaped member, said pivot means being disposed at the central arms of said members, said control surfaces comprising gear teeth at one end of each of said members, said single member being a shaft having oppositely directed screw threads thereon, one of said threads engaging with said gear teeth on one of said members and the other thread engaging with said gear teeth on the other member.

11. A diaphragm as defined in claim 4, wherein each of said blade elements comprises a substantially Z-shaped member, said pivot means being disposed at the central arms of said members, said control surfaces comprising gear teeth at one end of each of said members, said single member being a shaft having oppositely directed screw threads thereon, one of said threads engaging with said gear teeth on one of said members and the other thread engaging with said gear teeth on the other member.

12. A diaphragm according to claim 4, wherein said single member of the control means is arranged to move in an arcuate path concentric with the axis of the aperture defined by the blade elements.

13. A diaphragm according to claim 4, wherein said single member is arranged for angular movement, said member and said control surfaces being so constructed and arranged that the angular displacement of each element is less than the angular movement of said member effecting this displacement.

14. A diaphragm for photographic apparatus comprising a pair of blade elements, each of said elements having edges defining at least one cutout at a point substantially corresponding to the cutout in the other element, said edges cooperating to define an adjustable light-passing aperture, each of said blade elements having an outer edge constituting a control surface, a pivot means connecting said elements to permit said elements to pivot within parallel planes relative to each other about a common axis equally spaced from said corresponding cutouts so that in one position of said elements, one element almost covers the cutout in the other element to form a small aperture between said corresponding cutouts for permitting a small quantity of light to pass through that aperture, while in another position of said elements, the edges of said corresponding cutouts in both elements together form a large aperture for permitting a large quantity of light to pass through that aperture, a common control member having a control surface with closely adjacent points thereon constantly engaging, respectively, with said control surfaces of both blade elements for adjusting said elements relative to each other and simultaneously in opposite directions about said common axis, said control surfaces being shaped so that, when said control member is moved between predetermined equidistant points in one direction along said surfaces and from one of said points to the adjacent point, the area of said aperture will be increased to twice its size corresponding to the previous position of said elements at said one point, and when said control member is equally moved in the other direction from said one point, said area will be reduced to one-half of its size corresponding to the previous position of said elements at said one point.

15. A diaphragm as defined in claim 14, comprising resilient means acting upon said elements for maintaining said control surfaces in positive engagement with said common control member.

16. A diaphragm as defined in claim 14, wherein said common control member comprises a single pin having a path of movement eccentric to said pivot means.

References Cited in the file of this patent

UNITED STATES PATENTS

| | | |
|---|---|---|
| 871,654 | Watkins et al. | Nov. 19, 1907 |
| 2,105,475 | Draeger | Jan. 18, 1938 |
| 2,421,499 | Guedon | June 3, 1947 |